United States Patent
Wei et al.

[11] Patent Number: 6,058,828
[45] Date of Patent: May 9, 2000

[54] CONTINUOUS COOKING SYSTEM FOR SOLID DAILY DISHES

[75] Inventors: Shyan-Chiin Wei, Hsinchu; Jong-Jyh Chen, Taipei; Li-Hwang Chen, Chia Yi; Fuh-Juin Kao; Kai-Heng Yu, both of Hsinchu, all of Taiwan

[73] Assignee: Food Industry Research and Development Institute, Hsinchu, Taiwan

[21] Appl. No.: 09/281,477

[22] Filed: Mar. 30, 1999

[30] Foreign Application Priority Data

Jun. 30, 1998 [CN] China ................................. 87110558

[51] Int. Cl.[7] ................................. A47J 43/04; B01F 7/00
[52] U.S. Cl. ................................. 99/326; 99/331; 99/348; 99/353; 366/145; 366/318
[58] Field of Search ................................. 99/325–334, 348, 99/353, 443 R, 477–479; 366/144–146, 149, 194, 192, 195, 77–79, 318; 62/342, 343

[56] References Cited

U.S. PATENT DOCUMENTS

| | | |
|---|---|---|
| 896,551 | 8/1908 | Jurgens ................................. 366/149 X |
| 2,005,996 | 6/1935 | Kraft ................................. 99/348 |
| 3,064,908 | 11/1962 | Hjelte ................................. 366/194 X |
| 3,739,711 | 6/1973 | Nieblach ................................. 99/348 |
| 3,893,811 | 7/1975 | Good et al. ................................. 366/149 X |
| 4,048,473 | 9/1977 | Burkhart ................................. 99/331 X |
| 4,463,572 | 8/1984 | Brown, Jr. ................................. 62/342 X |
| 4,653,281 | 3/1987 | Van Der Veer ................................. 62/342 X |
| 4,702,608 | 10/1987 | Garber et al. ................................. 366/146 |
| 4,733,607 | 3/1988 | Star et al. ................................. 99/348 |
| 4,758,097 | 7/1988 | Iles, Sr. ................................. 366/149 |
| 5,329,842 | 7/1994 | Zittel ................................. 99/348 |
| 5,427,015 | 6/1995 | Zittel ................................. 99/348 |

*Primary Examiner*—Timothy Simone
*Attorney, Agent, or Firm*—Scully, Scott, Murphy & Presser

[57] ABSTRACT

A continuous cooking system for solid daily dishes comprising a cooker wherein the solid dishes are advanced spirally in a first-in-first-out manner, and during the process the dishes are heated by an external heating medium; a driving mechanism for generating actuating force for actuating the spiral advance in the cooker; and a sensing control mechanism for sensing the temperature in the cooker and for controlling the volume of the external heating medium to be dispensed and the actuating force of the driving mechanism according to said temperature. By means of this, the solid dishes can be fed continuously into the cooker and cooked dishes can be delivered continuously out the cooker.

7 Claims, 6 Drawing Sheets

CONTINUOUS COOKING SYSTEM FOR SOLID DAILY DISHES

BACKGROUND OF THE INVENTION

The present invention relates to a food cooking system and, in particular, to a continuous cooking system for solid daily dishes.

DESCRIPTION OF RELATED ART

In general, the first essential in cooking is the so-called "huo hou", that is, the temperature and length of time for cooking and heating the food. If the foods are not cooked and heated at a suitable temperature and for an adequate length of time, the cooked foods may neither taste nor look good. In addition, the "huo hou" for cooking is closely related to the quantity of the food to be cooked. Thus, the greater quantity of the food is, the more difficult it is to control the "huo hou". Further, foods in solid form are divided into meats and vegetarian kinds. The meats need to be fried or roasted in a hot oil, while for the vegetarian foods, such as vegetable leaves, some are directly stir-fried in a hot oil and some are first scalded in boiling water and then mixed and fried.

Therefore, for the foods in solid form to be cooked well, they have to be prepared by a chef, or by one skilled in the art, in a centralized or small-sized kitchen using various cooking utensils under careful control of the "huo hou", delicately flavored, and processed in batch operations, then, the cooked foods can be delicious. However, since human action is involved in food cooking, the cooked foods may significantly differ in their appearance, flavor and taste. In addition, in the case that the foods are cooked manually, unevenness may occur in the cooking such that if the foods are not eaten immediately after being cooked, there is the possibility that the remaining microorganisms may multiply due to incomplete heating, or may even lead to food poisoning.

In view of the above problems, there has been developed a twin-pan fryer device, such as that disclosed in ROC New Utility Model Patent No. 070623, in which foods are cooked by utilizing machines in place of a cook, and the "huo hou" is under mechanical control such that influences due to human factors are excluded. However, although such mechanical batch fryers do the job for a cook, the food cooking operation is still performed in large pans and there is still the problems of uneven heating of the foods. Further, the hygiene and quality problems with the foods remain unsolved.

SUMMARY OF THE INVENTION

Therefore, in order to overcome the above disadvantages with conventional food fryers, an object of the present invention is to provide a continuous cooking system for solid daily dishes with which hygienic quality cooked foods which are excellent in appearance, flavor and taste can be obtained. It is also an object of the present invention to provide an improved method for achieving the above object.

To this end, the continuous cooking system for solid daily dishes according to the present invention comprises a cooker wherein the solid dishes can be advanced spirally in a first-in-first-out manner, and during the process the dishes are heated by an external heating medium; a driving mechanism for generating actuating force for actuating the spiral advance in the cooker; and a sensing control mechanism for sensing the temperature in the cooker and for controlling the volume of the external heating medium to be dispensed and the actuating force of the driving mechanism according to said temperature. By this means, the solid dishes can be fed continuously into the cooker and cooked dishes can be delivered continuously out the cooker.

With the above system, solid dishes can be automatically and continuously cooked and the "huo hou", i.e., the cooking temperature and length of time, can be automatically controlled.

Moreover, when a saturated steam is used as the heating medium, foods can be cooked at high temperature for a short time such that microorganisms can effectively be killed, and because there is no water lost from the foods, the cooked foods have good texture, taste good to the mouth, and a high content of vitamins can be retained.

In addition, when a flavoring dispenser is added to said system for automatically adding flavorings into the cookers when foods are advanced, they can be flavored automatically, such that the cooked foods are homogeneous in taste and uniformly salted and can have a good appearance.

Further, when another cooker is added to the above continuous cooking system for solid daily dishes so as to have a precooker and a main cooker, it is possible to prepare foods which need long time for frying or simmering. Still further, when a crushing mechanism is added between the cookers, it is possible to prepare foods which need to be crushed so as to avoid the foods becoming clumped during the cooking process.

In addition, a cooker according to the present invention comprises a cooking drum in the shape of an elongated drum and having at least at one end a food inlet and at the other end a food outlet; a conveying-mixing-heating mechanism rotatably pivoted on said cooking drum for continuously spiralling the solid foods with the external actuating force on the one hand and applying the dispersed heating medium to the foods during the advancing process on the other hand.

With the above configuration, continuous manual food cooking can be effected as that obtained from the above-mentioned automatic cooking system.

Therefore, with the first-in-first-out spiral advancing approach, various effects not conventionally available can be obtained.

DESCRIPTION OF THE DRAWINGS

The above and other objects, features and functions of the present invention will become apparent from the detailed description of the preferred embodiments thereof given in conjunction with the accompanying drawings in which:

FIGS. 3 and 3a are a schematic enlarged sectional view of the end cover of the cooker as shown in FIG. 2.

DETAILED DESCRIPTION OF THE INVENTION

The technical concept of the present invention will now be described in further detail by way of preferred embodiments. It should be understood that the embodiments are given to illustrate the preferred configuration of the present invention without limiting the scope thereof.

Figure 1:
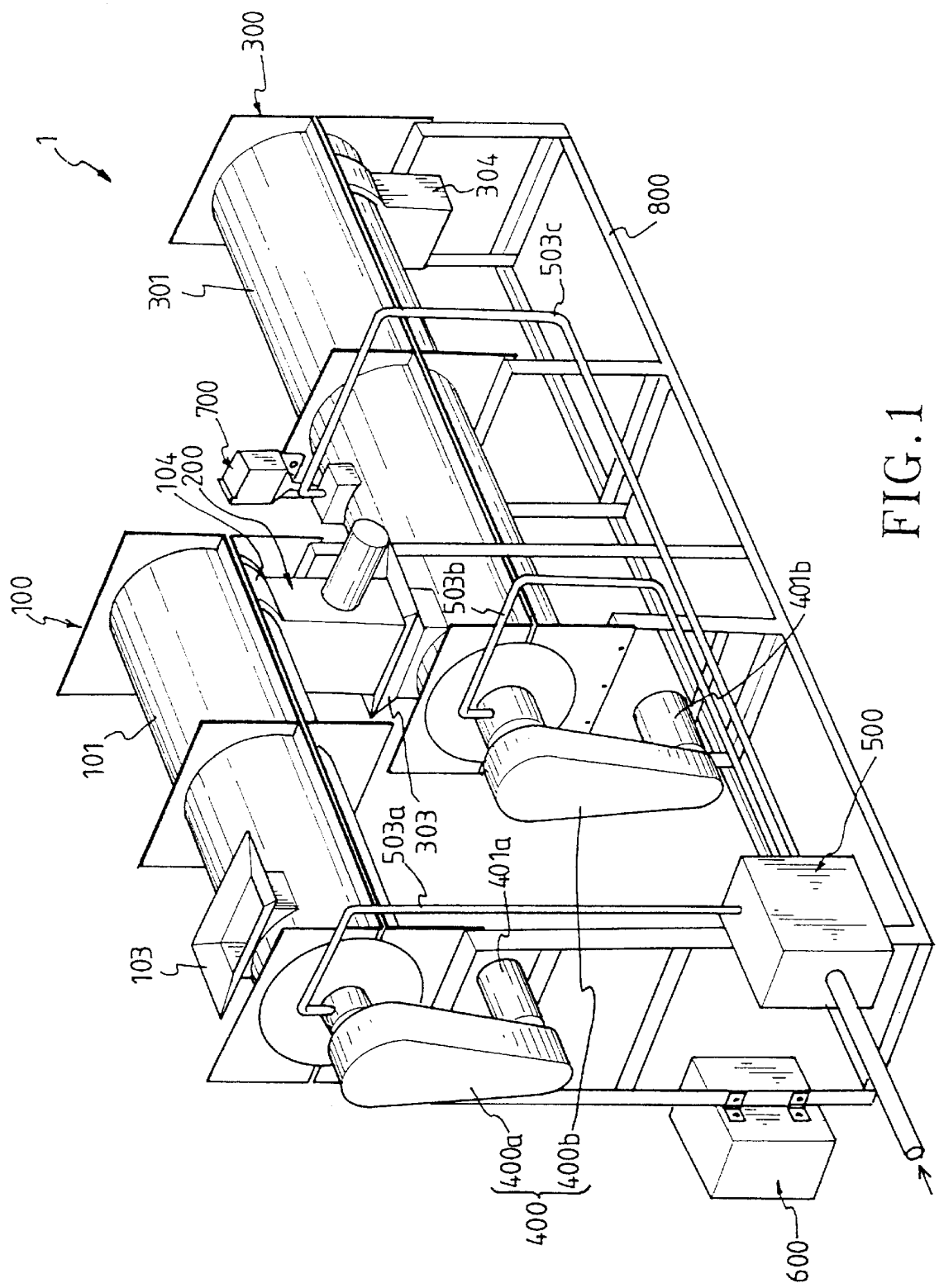
FIG. 1 is a schematic perspective view of the continuous solid dish cooking system as constructed according to the present invention.

FIG. 1 is a schematic perspective view of the continuous solid dish cooking system as constructed according to the present invention, wherein a saturated steam is used as the heating medium. As shown in FIG. 1, the continuous cooking system for solid daily dishes comprises a precooker 100, a crushing mechanism 200, a main cooker 300, a driving mechanism 400, a heating medium dispensing mechanism 500, a sensing control mechanism 600, a flavoring adding mechanism 700, and a base 800 for supporting all the above mentioned components.

Figure 2:
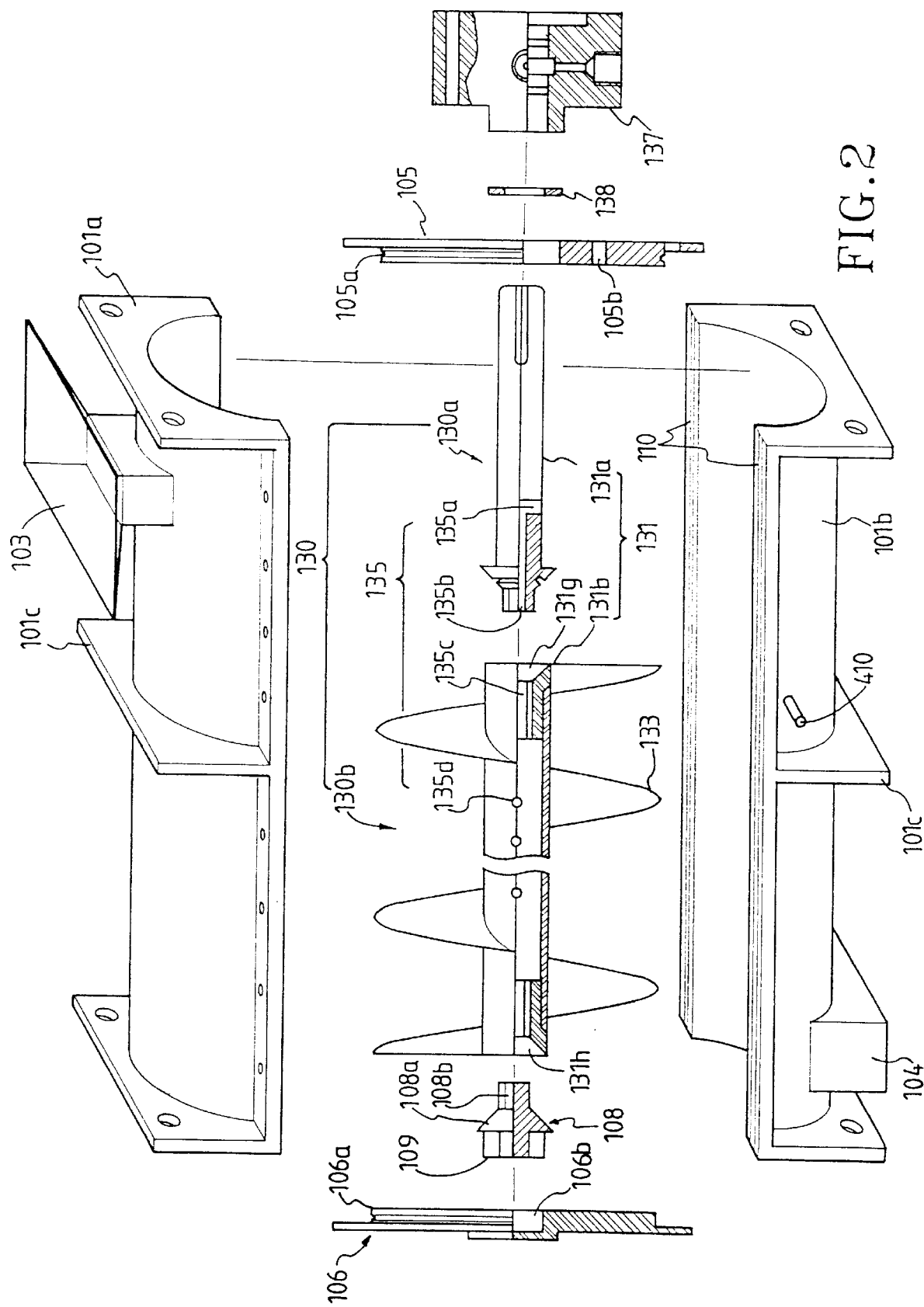
FIG. 2 is a schematic exploded perspective view of the cooker according to the present invention.

The continuous cooking system for solid daily dishes of the present invention will be described hereinafter in greater detail. As shown in FIG. 2, the cooker 100 in the continuous cooking system for solid daily dishes 1 of the present invention comprises a cooking drum 101 in the shape of an elongated drum and a conveying-mixing-heating mechanism 130. The cooking drum 101 is comprised removably with an upper and a lower circular grooved casings 101a, 101b, with a sealing formed therebetween by means of a sealing strip 110, and provided at suitable intervals with reinforcing ribs 101c, for reinforcement on the one hand and for securing the cooking drum 101 on the base 800 on the other hand. Both ends of the cooking drum 101 are sealed by an end cover plate 105, 106, respectively, through a sealing strip (not shown) placed in the groove 105a, 106a on the edge of the end cover plates. On one end of the cooking drum 101, the upper casing 101a is provided with a food inlet 103, and on the other end of the cooking drum 101, the lower casing 101b is provided with a food outlet 104. Next, a temperature well 410 is provided on the lower portion of the lower casing 101b of the cooking drum 101, in which a thermometer is installed for sensing the temperature inside the cooking drum 101.

The conveying-mixing-heating mechanism 130 comprises a spindle 131 consisting of a first shaft 131a and a second shaft 131b; a succession of spiral-shaped fins 133 spiralling along the second shaft 131b of the spindle 131 and having the inner edge thereof secured to the outer surface of the second shaft 131b; a heating medium channel 135 for carrying a heating medium such as a saturated steam; and a transmission and steam distributing bearing seat 137 secured to the outer surface of the end cover plate 105 for receiving the incoming heating medium and transferring thereof to the heating medium channel 135, and serving as the bearing for the first shaft 131a, wherein the heating medium channel 135 further comprises a radially extending inlet 135a positioned on the first shaft 131a, a first passage 135b positioned inside the first shaft 131a, a second passage 135c positioned inside the second shaft 131b, and a plurality of radially extending outlet 135d positioned on the second shaft 131b.

Figure 3:
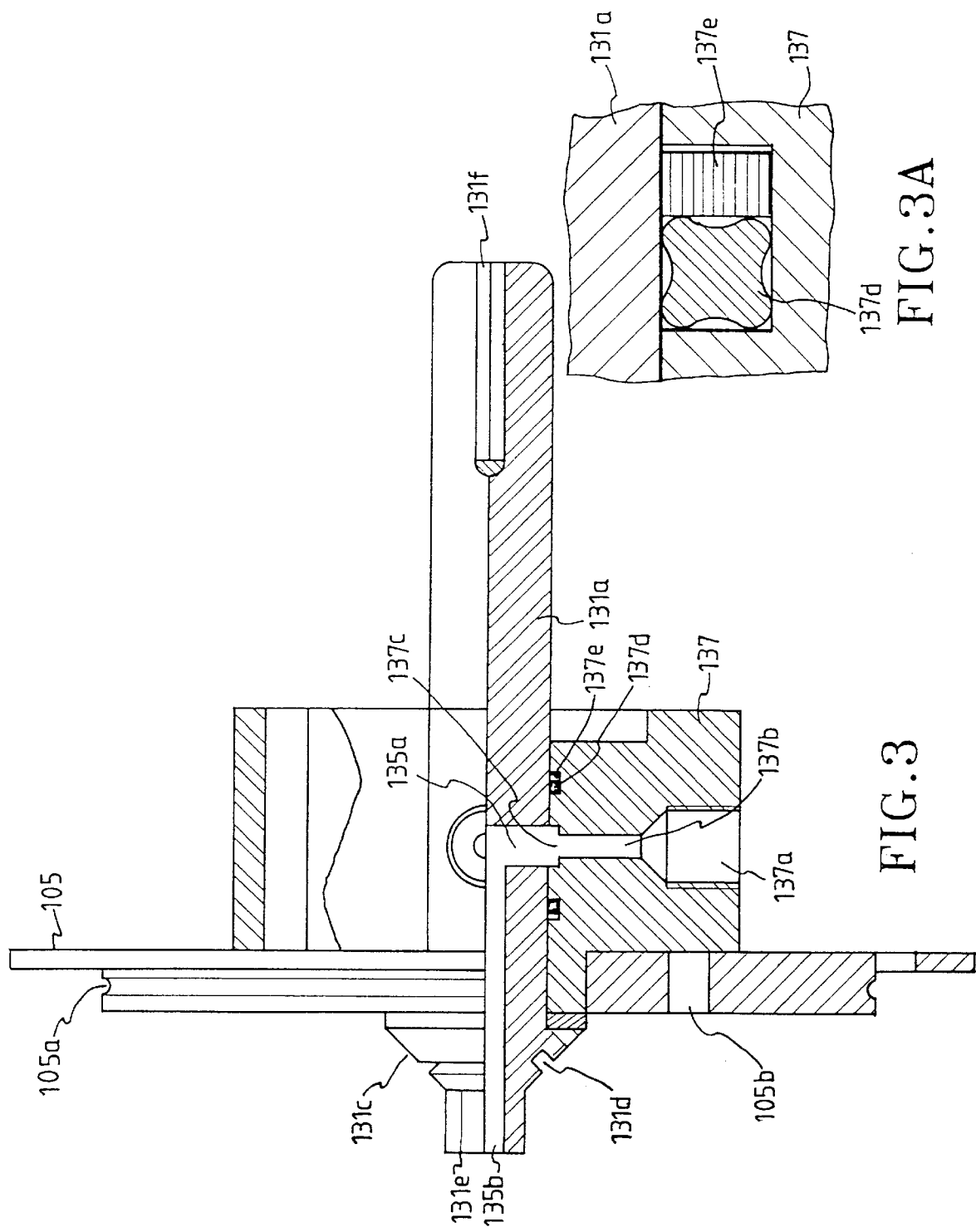

The relationship between the first shaft 131a and the transmission and steam distributing bearing seat 137 is shown in detail in FIG. 3. As shown in FIG. 3, one end of the first shaft 131a is positioned on the inside of the end cover plate 105 and has a tapered holder 131c which comprises a groove 131d for installing a ring washer (not shown), and an outer hexagonal retaining stud 131e axially projected from the end thereof. The other end of the first shaft 131a has a key slot 131f for engaging a transmission gear (not shown) in combination with a key (not shown). The first passage 135b of the heating medium channel 135 is provided roughly in the axle center of the first shaft 131a, and the inlet 135a thereof is radially penetrated out from the shaft body. This unitary member comprising the first shaft 131a and the first passage 135b can be referred to as the transmission and steam distributing shaft 130a.

The bearing seat 137 is secured to the end cover plate 105 by means of a sealing ring 138 and the threading holes 105b provided on the end cover plate 105, and is provided therein with a steam receiving port 137a, a radial passage 137b, and an inner annular groove 137c communicating with the inlet 135a of the heating medium channel 135. Moreover, a leak proof construction consisting of a sealing ring 137d and a protective ring 137e is provided by the side of the inner annular groove 137c such that when the first shaft 131a rotates in the transmission and steam distributing bearing seat 137, the steam passing therethrough will not leak out.

Next, turning to FIG. 2, as shown, the end cover plate 106 has a recess 106b for carrying a centering axle 108, the centering axle 108, being similar to the supporting seat 131c of the first shaft 131a, having a tapered face 108a and an outer hexagonal stud 108b of specified length. In addition, both ends of the second shaft 131b have recesses 131g, 131h for the centering axle 108 and the supporting seat 131c to be inserted and mating in shape therewith.

With the above configuration, the second shaft 131b will be rotated by being removably driven by the first shaft 131a. After the second shaft 131b is assembled to the first shaft 131a, the steam entering the first passage 135b of the first shaft 131a can be transmitted in a leak proof manner to the second passage 135c extending at the axial center of the second shaft 131b, and then ejected into the cooking drum 101 from the plurality of outlets 135d communicating with the second passage 135c and serving as steam nozzles. By means of the spiral-shaped fins 133 secured on the second shaft 131b, when the second shaft 131b rotates, the foods entering the food inlet 103 at one end of the cooking drum 101 are spirally advanced to the other end while being heated, and delivered out from the outlet 104 at the other end. At the same time when being spirally advanced, the foods are turned over, which substantially equals being stirred. As a result, the unitary member consisting of the second shaft 131b and the spiral-shaped fins 133 can be referred to as a conveying-mixing-heating spiral 130b, which, together with said transmission and steam distributing shaft 130a and the transmission and steam distributing bearing seat 137, is further combined into the so-called conveying-mixing heating mechanism 130.

Basically, said steam nozzles (outlets) 135d are positioned roughly over the entire middle portion of the second shaft 131b, that is, at an intermediate position on the overall length of the spindle 131. Alternatively, the nozzles are more closely spaced such that the foods, after entering the inlet 103, are first in a preheating condition, then being transferred to the central section, and finally being in a warm-keeping condition near the end before being delivered, so as to be in conformity with the customary "huo hou" control required for food frying. In addition, the pitch between the continuous spiral fins 133 can be made larger in the middle region of the second shaft 131b, that is, the middle region of the cooking drum 101, than that in both end regions, such that the foods will be moved more slowly when being transferred to the middle region, and faster in the end regions. As a result, a fast frying process is effected, and since the saturated steam is used as the heating medium, foods which are excellent in taste to the mouth without losing the nutrients can be obtained because no water will be lost. Moreover, the cooking drum 101 can be opened and the conveying-mixing-heating spiral 130b can be removed and cleaned for hygienic consideration.

In fact, it can be seen from the construction and operation of the above illustrated precooker 100 that as long as external force is applied to the spindle 131 and the heating medium is supplied into the cooking drum 101, with the temperature and time being manually controlled, cooked foods can be delivered from the outlet simply by utilizing the cooker 100 and by having foods and flavorings serving sly fed from the inlet, thereby serving the purpose of the continuous cooking system for solid daily dishes as taught by the present invention. However, with some foods, it is preferable that the foods be heated one step after another, and that during the heating process, food dispersing movements can be introduced. Therefore, the continuous cooking system for solid daily dishes as disclosed in the present invention may further comprise the following members.

Figure 4:
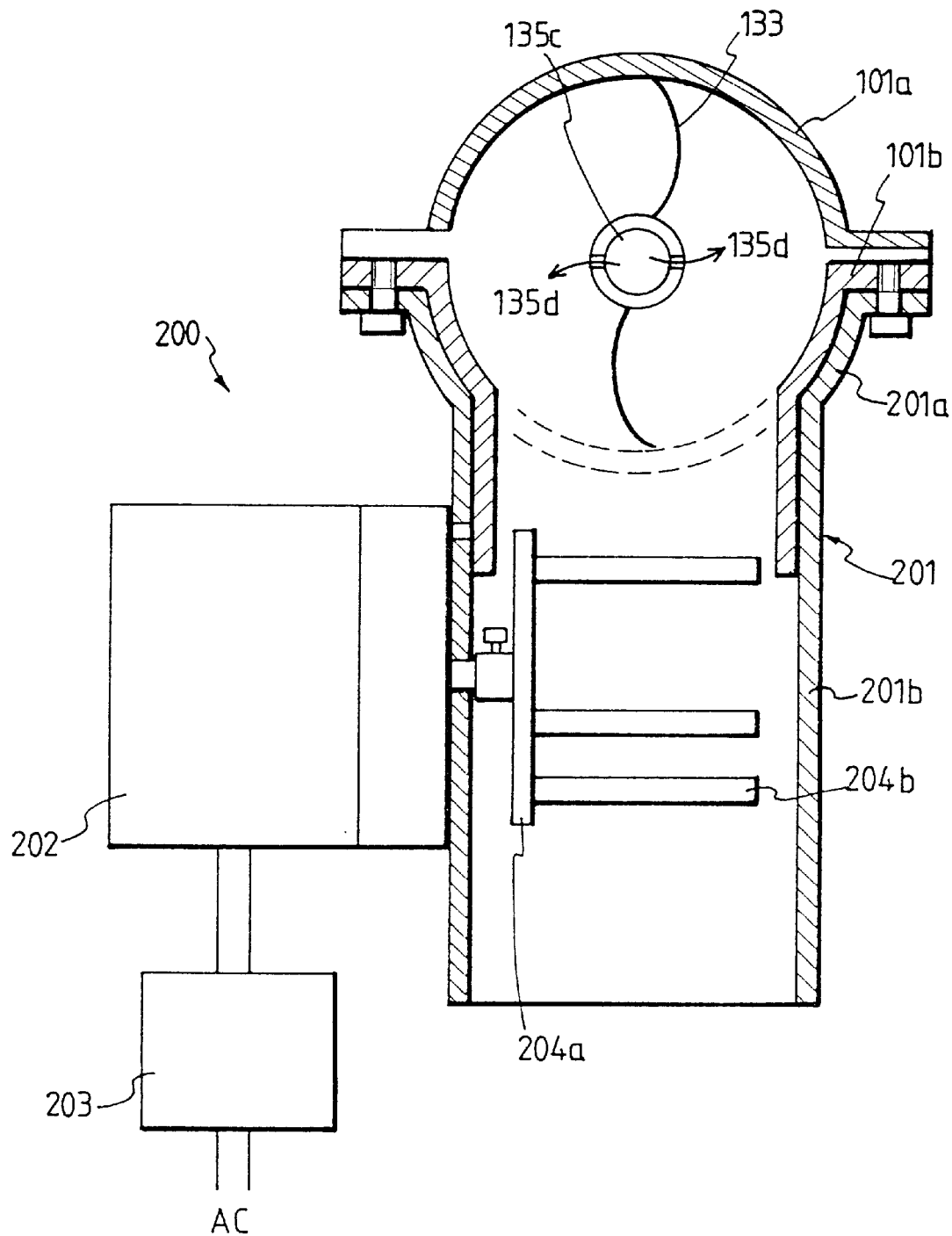
FIG. 4 is a schematic sectional view of the crushing mechanism in the continuous solid dish cooking system as shown in FIG. 1.

FIG. 4 illustrates the detailed construction of the crushing mechanism 200 in the continuous cooking system for solid daily dishes 1 according to the present invention. As shown in FIG. 4, the crushing mechanism 200 comprises a casing 201 including a connecting portion 201a secured to the cooking drum 101 for connecting the food outlet 104 of the cooking drum 101, and a generally rectangular tubing portion 201b; a reducing motor 202 secured outside the tubing portion 201b, the speed of the reducing motor being controlled by a converter 203; and a crusher 204 driven to rotate by the reducing motor 202 and positioned inside the tubing portion. The crusher 204 comprises a disk 204a secured on the motor shaft and oriented radially in the moving direction of the foods, and a plurality of crushing rods 204b secured on the disk 204a which can change position and are projected axially roughly over the entire lateral internal space in the tubing portion.

With the above configuration, for some foods such as the stir-fried meats, which need to be crushed during the cooking process in order to prevent the foods from being stuck together, can be crushed by the crushing rods 204b when passing through the crushing mechanism 200 in the tubing portion 201b by gravity, and then entering the main cooker 300 to undergo the main flavoring and cooking processes.

As shown in FIG. 1, the inner and the outer configurations and the operation of the main cooker 300 are generally the same as the precooker 100, with the only difference being that a flavoring adding mechanism 700 is added. Therefore, the description of the internal configuration and the components of the main cooker 300 is omitted for clarity, and only the flavoring adding mechanism 700 is described.

Figure 6:
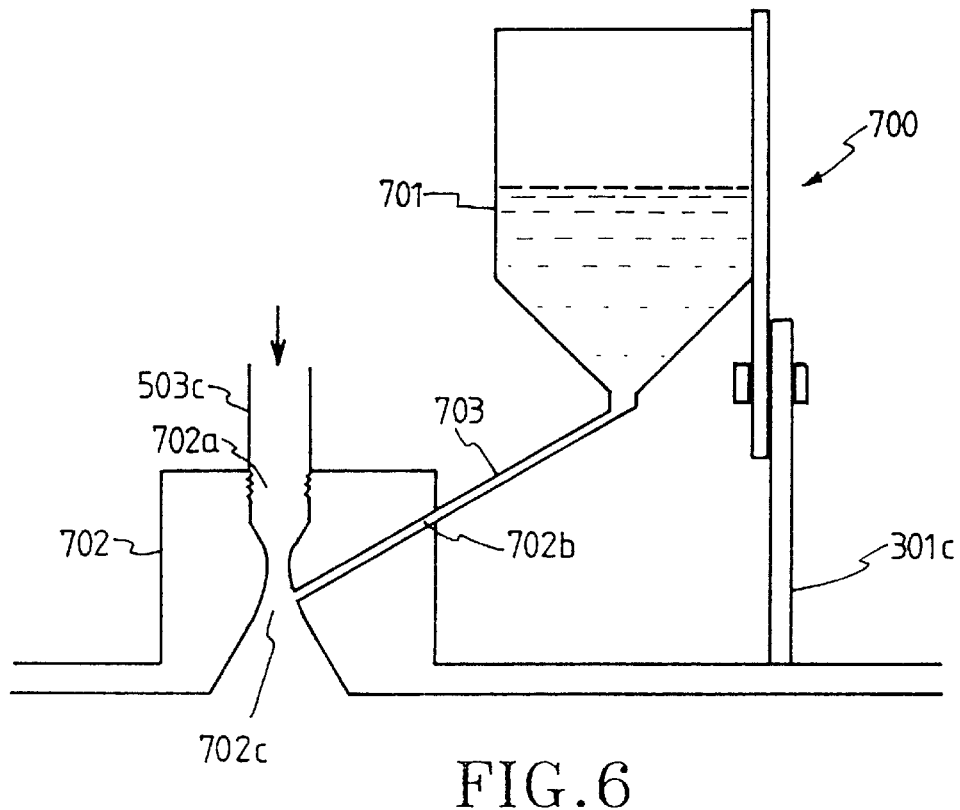
FIG. 6 is a schematic sectional view of the flavoring adding mechanism in the solid dish cooking system as shown in FIG. 1.

As shown in FIG. 6, the flavoring adding mechanism 700 comprises a container 701 secured to the casing reinforcement ribs 301c on the cooking drum 301 of the main cooker 300; an actuating block 702 for actuating addition of the flavorings; and a conveying tube 703 for conveying the flavorings in the container 701 to the actuating block 702. The actuating block 702 has a first opening 702a for inputting steam acted as a carrying fluid, a second opening 702b connecting the conveying tube 703 for the input of the flavorings acted as a carried fluid, and a mixer-sprier port 702c which effects a function of the venture principle. The structure using the carrying and carried fluids are herein termed as two-fluid construction.

With the above configuration, when the steam is input from the first opening 702a, the flavorings will be entrained to flow into the cooking drum 301 such that the flavorings are added into the foods in the cooking drum 301. When the foods undergo the secondary heating in the main cooker and are delivered out the food outlet 304 of the main cooker 300, well cooked foods are obtained.

Figure 5:
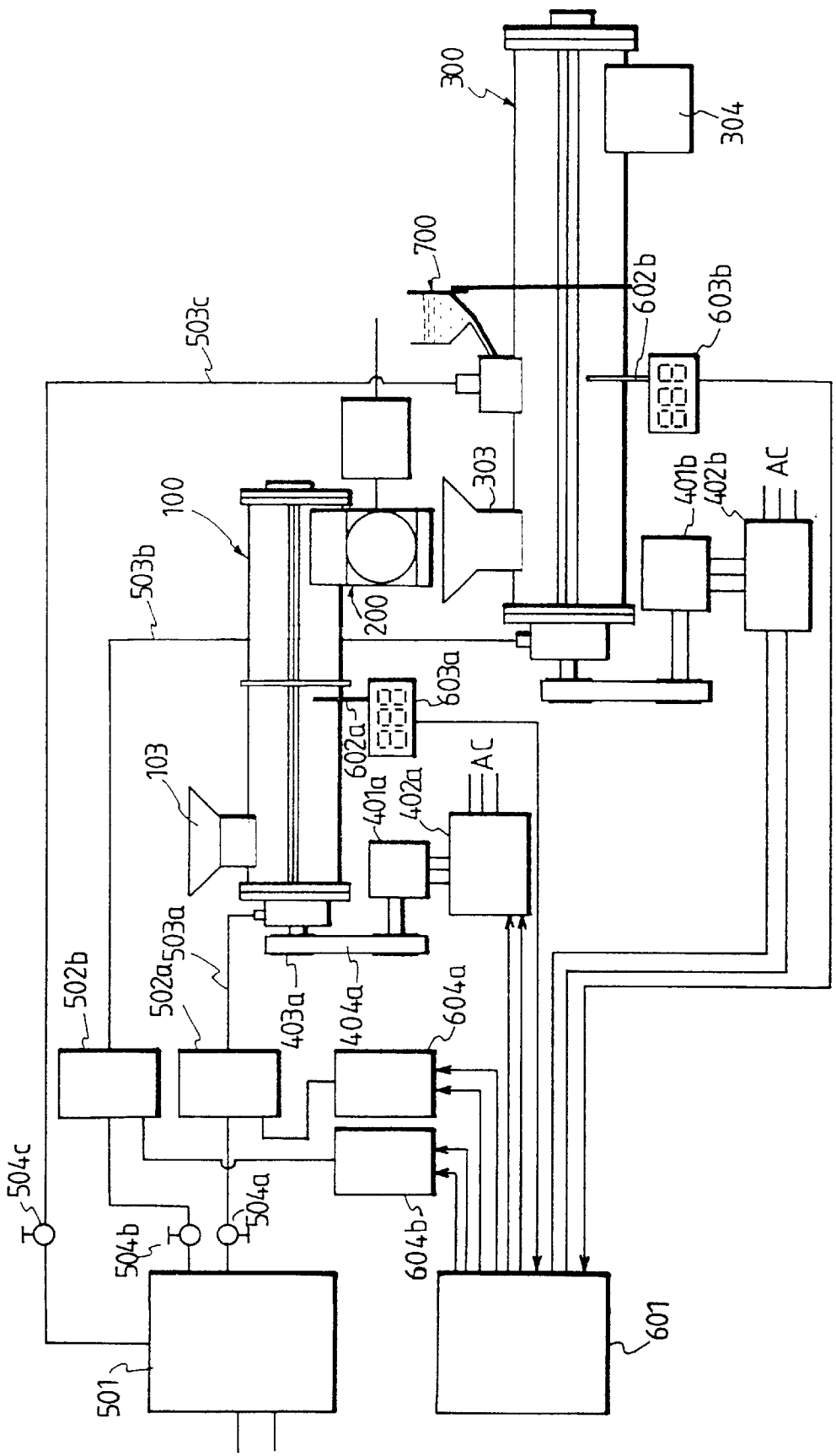
FIG. 5 is a schematic view illustrating the control of the solid dish cooking system as shown in FIG. 1.

Next, the driving mechanism 400, the heating medium dispensing mechanism 500, and the sensing control mechanism 600 in the continuous cooking system for solid daily dishes 1 according to the present invention will be described. FIG. 5 is a schematic view illustrating the control of the solid dish cooking system as shown in FIG. 1. As shown in FIG. 5, the driving mechanism 400 comprises a driver 400a for the precooker 100 and a driver 400b for the main cooker 300. The driver 400a is similar to the driver 400b, so only the driver 400a is described. As shown in FIG. 5, the driver 400a comprises a motor 401a; a converter 402a; a gear train 403a; and a timing belt 404a. One of the gear train 403a is secured to the first shaft 131a of the precooker 100, such that when the converter 402a is under the control of the controller 601, causing the motor 401a to rotate, the first shaft 131a is caused to rotate through the gear train 403a and the timing belt 404a, further causing the conveying-mixing-heating spiral 130b to rotate, and bringing the foods to move ahead.

Figure 7:
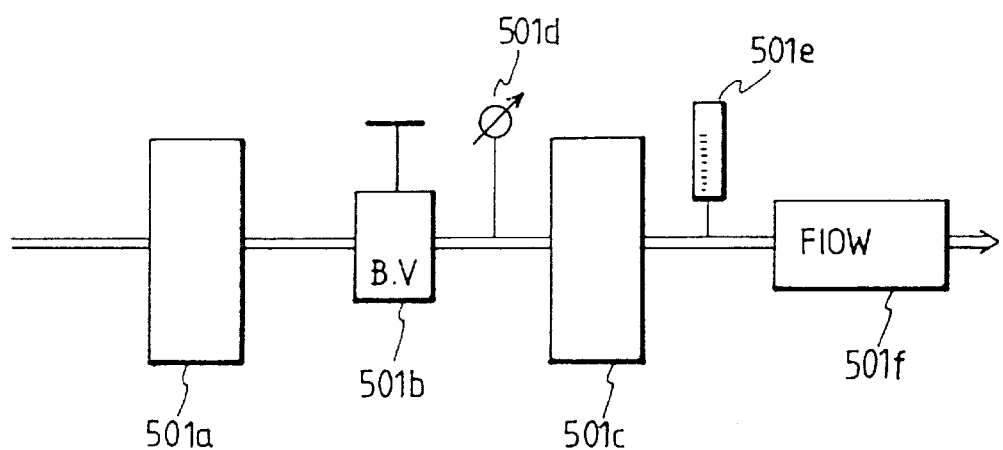
FIG. 7 is a schematic view of the configuration of a purifier means in the solid dish cooking system as shown in FIG. 2.

Moreover, the heating medium dispensing mechanism 500, as generally shown in FIG. 5, comprises purifier means 501; heating medium ratio control valves 502; heating medium conveying tubes 503; and manually operated heating medium valves 504. As shown in FIG. 7, the purifier means 501 may comprise an initial purifier 501a, a pressure adjusting valve 501b, a main purifier 501c, a pressure gauge 501d, a thermometer 501e, and a flow meter 501f, for purifying the steam used as the heating medium such that the water added to the foods meets the safety and sanitary standards. The heating medium ratio control valves 502 comprises a ratio valve 502a for controlling the amount of the steam input to the precooker 100, a ratio valve 502b for controlling the amount of the steam input to the main cooker 300, and a ratio valve 502c for controlling the amount of the steam input to the flavoring adding mechanism 700. The heating medium conveying tubes 503 comprise heating medium conveying tubes 503a, 503b, 503c leading to the precooker 100, the main cooker 300, and the flavoring adding mechanism 700 respectively. In addition, manually operated valves 504a, 504b, 504c are interposed, respectively, in each of the heating medium conveying tubes 503a, 503b, 503c.

Therefore, as long as the continuous cooking system for solid daily dishes 1 is connected to an external heating medium source through the heating medium dispensing mechanism 500, the amount of the heating medium each part of the present cooking system requires can be supplied and controlled.

In addition, the sensing control mechanism 600 comprises a controller 601; temperature sensing rods 602a, 602b positioned in the temperature well in each of the cookers; and other circuits for controlling the ratio valves 502a–b. Further, the ratio valves 502a–b are controlled with compressed air which, in turn, are controlled through the p/i valves 604a, 604b. Besides, the ratio valves 502a–b may also be directly electrically controlled. As a result, by sensing the temperature by means of the temperature sensing rods 602a, 602b and by referring to the preset parameters regarding the cooking time, the temperature, etc., calculation and comparison can be made, and output signals can be applied to the ratio valves 502*a*–*b,* converters 402*a,* 402*b,* 203, and then it is possible to exercise control for optimal "huo hou" and cooking time, thereby to produce the best cooked foods.

From the foregoing, in the continuous cooking system for solid daily dishes according to the present invention, the professional cook's skill that "cooking in a small pan makes well cooked foods" is followed, wherein firstly the food frying operations are mechanized such that solid foods can be in sufficient contact with the heating medium to become completely heated. Then with the "first-in-first-out" concept being introduced, the solid foods can be continuously conveyed, stirred, and fried by means of a stirring mechanism having the conveying function. Finally, flavorings are automatically added by means of a flavoring adding mechanism such that delicious, sanitary and safe cooked foods can be obtained. Correspondingly, it is to be understood that an improved cooking method is also disclosed by using said continuous cooking system for solid daily dishes according to the present invention.

However, the above said embodiments only illustrate the technical concept of the present invention without limiting the scope thereof. For example, while the saturated steam is used as the heating medium in the embodiments, hot air can also be used, although less preferably, as long as continuous stirring and conveying based on the "first-in-first-out" principle is followed, with some minor alterations. In addition, if the incoming steam is clean enough, purifying means may not be required, and if only one cooker is used for cooking, the steam may be introduced directly into the cooking drum without requiring the heating medium dispenser means, and the related control valves are attributed to the temperature sensing and control mechanism. Furthermore, while the flavoring adding mechanism is preferably installed at the end section in the cooker, for some foods, if the flavorings can be premixed with the foods and entered together with the foods, it may not be necessary. Therefore, it should be understood that all the modifications and alterations that are apparent to those skilled in the art are within the scope as defined in the appended claims of the present application.

We claim:

1. A continuous cooking system for solid daily dishes comprising:

a cooker for pushing solid foods therein to spirally advance in a first-in-first-out manner, and for heating the foods with a heating medium during the advancing process;

a driving mechanism for generating actuating force to actuate the spiral advancing in said cooker;

a sensing control mechanism for sensing the temperature in said cooker and for controlling the amount of the heating medium to be dispensed, the actuating force of the driving mechanism according to said temperature; whereby said solid foods can be continuously fed into said cooker and cooked foods can be continuously delivered out said cooker.

2. The continuous cooking system for solid daily dishes according to claim 1 wherein said heating medium is a saturated steam.

3. The continuous cooking system for solid daily dishes according to claim 1 further comprising a flavoring adding mechanism for automatically adding flavorings into said cooker during the food advancing process.

4. The continuous cooking system for solid daily dishes according to claim 3 wherein said flavoring adding mechanism includes a two fluid construction.

5. The continuous cooking system for solid daily dishes according to claim 3 further comprising a heating medium dispensing mechanism for dispensing external heating medium to said cooker and said flavoring adding mechanism.

6. A continuous cooking system for solid daily dishes comprising:

a precooker for pushing solid foods therein to spirally advance in a first-in-first-out manner, and for heating the foods with a heating medium during the advancing process;

a crushing mechanism for crushing the foods delivered from said precooker;

a main cooker for receiving the foods delivered out said crushing mechanism and for pushing solid foods therein to spirally advance in a first-in-first-out manner, and for applying an external heating medium to heat said foods during the advancing process;

a driving mechanism for generating actuating force to actuate the spiral advancing in said precooker and said main cooker;

a flavoring adding mechanism secured to said main cooker for adding flavorings to said foods during the food advancing process;

a heating medium dispensing mechanism for dispensing external heating medium to said precooker and said main cooker;

a sensing control mechanism for sensing the temperature in precooker and said cooker and for controlling the amount of the heating medium to be dispensed, the actuating force of the driving mechanism, and the amount of the flavorings to be added according to said temperature; whereby said solid foods can be continuously fed into said cooker and cooked foods can be continuously delivered out said cooker.

7. The continuous cooking system for solid daily dishes according to claim 6 wherein said heating medium is a saturated steam and said heating medium dispensing mechanism also dispenses the steam to said flavoring adding mechanism.

\* \* \* \* \*